United States Patent [19]

Hoshino et al.

[11] Patent Number: 4,586,815

[45] Date of Patent: May 6, 1986

[54] ORIGINAL TABLE FOR USE IN AN IMAGING APPARATUS OR THE LIKE

[75] Inventors: Fumio Hoshino; Yasuyoshi Mochizuki, both of Tokyo, Japan

[73] Assignee: Fuji Photo Film Co., Ltd., Kanagawa, Japan

[21] Appl. No.: 629,381

[22] Filed: Jul. 10, 1984

[30] Foreign Application Priority Data

Jul. 11, 1983 [JP]  Japan ................. 58-126324

[51] Int. Cl.$^4$ .................. G03B 27/62; G03B 27/64
[52] U.S. Cl. ............................. 355/76; 355/91
[58] Field of Search ................. 355/76, 73, 91

[56] References Cited

U.S. PATENT DOCUMENTS 4,065,210 12/1977 Milburn ................. 355/91
4,298,277 11/1981 Silverberg ............. 355/76
4,412,738 11/1983 Ahern et al. ........... 355/76

Primary Examiner—Richard A. Wintercorn
Attorney, Agent, or Firm—Sughrue, Mion, Zinn, Macpeak, and Seas

[57] ABSTRACT

An original table for use with an imaging apparatus or the like of a type wherein an original to be imaged is held in position by suction is disclosed. The surface of the table having holes through which air is drawn to provide the suction is covered with a sheet of nonwoven fabric having a high air permeability and high light reflectance. The sheet of nonwoven fabric is selectively coverable by an overlay member made of a transparent material that can be selectively applied over and detached from the sheet of nonwoven fabric in the case a paste-up or the like is to be imaged.

4 Claims, 4 Drawing Figures

ORIGINAL TABLE FOR USE IN AN IMAGING APPARATUS OR THE LIKE

BACKGROUND OF THE INVENTION

The present invention relates to a table for holding, by suction under vacuum, an original document to be imaged by an imaging apparatus or the like. More particularly, the invention relates to an original table suitable for use with an imaging apparatus that performs imaging of an original to provide an image on a printing plate or for use with a platemaking apparatus used for this purpose.

A typical configuration of an original table used with a conventional imager for plate making or platemaking apparatus is shown in FIG. 1. Specifically, an original mount 1 equipped at one side with a pivotable glass holder 2 holds the original 3 in position by means of the glass 2 during imaging.

A problem with the original table using a holder glass is that the glass is heavy and makes the handling of the table cumbersome. Furthermore, at low reduction ratios, the original table must be placed only a short distance from the optical system, and this prevents the glass holder from opening sufficiently to achieve perfect registry of the original.

SUMMARY OF THE INVENTION

The present invention has been accomplished to solve these problems of the conventional original table, and it provides an original table capable of easy replacement while providing accurate registry of the original.

More specifically, the present invention is achieved by an original table for use with an imaging apparatus or the like of the type wherein the original to be imaged is held in position by suction under vacuum, characterized in that the surface of the table, which has holes through which air is drawn, is covered with a sheet of nonwoven fabric having a high air permeability and high light reflectance.

DESCRIPTION OF THE PREFERRED EMBODIMENTS

Preferred embodiments of the present invention will hereunder be described with reference to the accompanying drawings.

Figure 1:
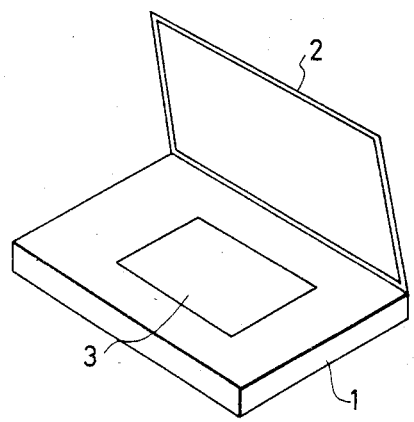
FIG. 1 is a perspective view showing the overall configuration of a conventional original table.
Figure 2:
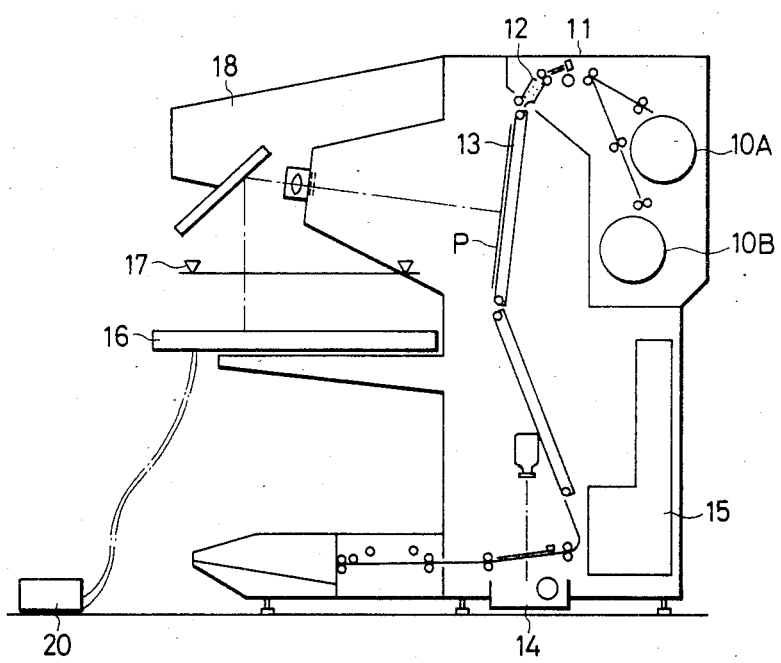
FIG. 2 is a side elevational view showing an electronic platemaking apparatus using the original table according to a preferred embodiment of the present invention.

FIG. 2 is a side elevational view of an electrophotographic platemaking apparatus that uses an original table according to one embodiment of the present invention. The apparatus includes plate holders 10A and 10B for holding rolls of a platemaking web P having a selectable width, a cutter 11 for cutting the web P, a charging unit 12 for electrostatically charging the web P, an exposure table 13 for performing optical exposure of the web P, a developing unit 14, an electrical unit 15, an original table 16, an illuminating lamp 17, and an imaging optical system including a mirror, a lens and a shutter.

The exposure table 13 has a vacuum suction transport mechanism composed of a vacuum section device and an endless belt. This mechanism has two functions, holding the web P by suction during exposure and transporting the web P before and after exposure.

Figure 3:
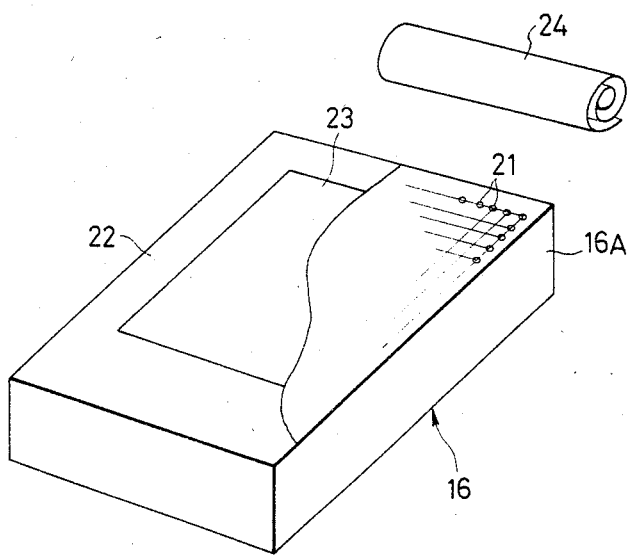
FIG. 3 is a perspective view showing the original table used in the apparatus of FIG. 2.

As shown in detail in FIG. 3, the original table 16 is composed of a suction box 16A and an air-permeable sheet 22. The suction box 16A has a number of suction holes 21 communicating with a chamber connected to a vacuum pump 20, and an air-permeable sheet 22 covering the entire surface of the top of the box 16A. The air-permeable sheet 22 is preferably made of a material having high dimensional stability, good compatibility with printing, and a high light reflectance. An example of such a material is a nonwoven fabric made of chemical fibers, which is generally known as printing cloth. High dimensional stability and good printing compatability are important for printing scales on the sheet 22 so that they provide good registry of the original with the original table. High light reflectance is necessary for avoiding unwanted imaging in the pattern of the holes 21 on the suction box 16A when a small original is placed on the sheet 22. A sheet of woven fabric is not preferred since it has a regular reticulate pattern which would be clearly reproduced on the web P during imaging.

The original table 16 has a roll of overlay sheet 24 in a position away from the operator. This overlay sheet is used to cover patched-up original and to provide an improved flatness thereof.

The charging unit 12, developing unit 14, electrical unit 15 and imaging optical system 18 may be implemented with known techniques and components, and will need no specific explanation.

The operation of the electrophotographic platemaking apparatus using the original table of the present invention shown in FIG. 2 proceeds as follows. The web roll 10A or 10B, which is properly selected depending upon the specifications of the press, feeds the web P which is cut to a predetermined size by the cutter 11. Charges are deposited on the web by the charging unit 12 before the web is fed to the exposure table 13. The vacuum suction unit holds the web P in position on the exposure table 13 to make it ready for imaging.

Figure 4:
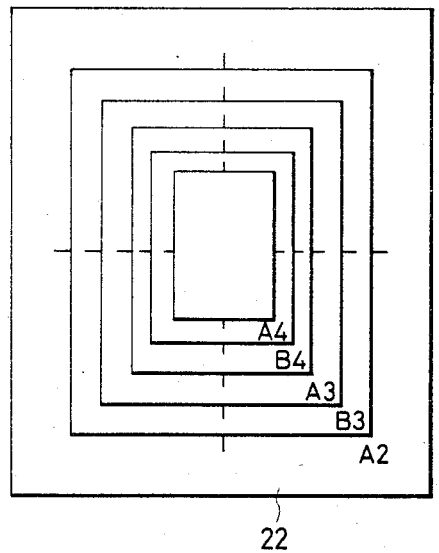
FIG. 4 is a plan view of an air-permeable sheet marked with scales that facilitate correct registry of the original.

The original 23 is then set on the table 16 after actuating the vacuum pump 20. The setting of the original is done by the operator who places the original in registry with one of the scales marked on the air-permeable sheet 22 on the table 16 as shown in FIG. 4. If the original is a patched-up one, the overlay sheet 24 is spread to cover the original in order to avoid a decrease in its flatness. Needless to say, the scales for ensuring registry of the original must be printed on the sheet 22 in colors having wavelengths that are not within the wavelength region to which the web P is sensitive.

After completing the setting of the original as above, the shutter of the optical system 18 is opened to start imaging. The imaged web P is forwarded to the developing unit 14. After development, the operator prepares for the next cycle of imaging, with a different original if necessary, and repeats the same procedure as described above.

The cycle of operations with the electrophotographic platemaking apparatus is performed either by sequence control or by program control with a microcomputer.

In the embodiment shown above, the roll of air-permeable sheet 22 is permanently attached to the original table 16. Needless to say, this sheet may be detachably installed so as to provide easy replacement of a fouled or worn sheet. An example of a technique that realizes this purpose is the use of a pincher.

In the embodiment shown above, the overlay sheet for use with a patched-up original is installed on the side of the original table 16 away from the operator. However, this sheet need not necessarily be fixed to the platemaking apparatus; instead, sheets of various sizes placed within easy access of the operator may be properly selected depending upon the size of the particular original.

The embodiment described above refers to the application of the original table of the present invention to an electrophotographic platemaking apparatus. However, it should be understood that the present invention is applicable to imagers employing various other image-forming techniques.

As will be apparent from the foregoing description, the original table of the present invention for use with an imaging apparatus or the like of the type wherein the original to be imaged is held in position by vacuum suction is characterized by the fact that the surface of the table having holes through which air is drawn is covered with a sheet of nonwoven fabric having a high air permeability and high light reflectance. Because of this characteristic, the original table of the present invention permits easy operations involved in the imaging process such as replacement and correct registry of the original.

We claim:

1. In an original table for use with an imaging apparatus or the like of a type wherein an original to be imaged is held in position by suction, the improvement wherein a surface of said table having holes through which air is drawn to provide said suction is covered with a sheet of nonwoven fabric having a high air permeability and high light reflectance, wherein said sheet is porous and has non-visible ports through which said air is drawn.

2. The original table of claim 1, wherein said sheet of nonwoven fabric comprises a printing cloth made of chemical fibers.

3. In an original table for use with an imaging apparatus or the like of a type wherein an original to be imaged is held in position by suction, the improvement wherein a surface of said table having holes through which air is drawn to provide said suction is covered with a sheet of nonwoven fabric having a high air permeability and high light reflectance, wherein said sheet is porous and has non-visible ports through which said air is drawn, and an overlay member made of a transparent material positioned to be selectively applied over and detached from said sheet of nonwoven fabric.

4. The original table of claim 3, wherein said sheet of nonwoven fabric comprises a printing cloth made of chemical fibers.

* * * * *